United States Patent Office 2,994,577
Patented Aug. 1, 1961

2,994,577
METHOD OF REMOVING IODINE FROM GASES AND FILTER MEDIUM THEREFOR
Leslie Silverman, Dover, Mass., assignor to the United States of America as represented by the United States Atomic Energy Commission
No Drawing. Filed Jan. 29, 1960, Ser. No. 5,576
3 Claims. (Cl. 23—2)

This application is a continuation in part of my co-pending application Serial Number 806,983, filed April 16, 1959.

The present invention relates to a method and apparatus for the removal of iodine from large gas volumes, and more particularly, to a method and apparatus utilizing surface treated copper fibres to remove gaseous iodine from hot gaseous products.

Considerable research on the methods of removing radioactive iodine, namely $I^{131}$, from process or ventililation gas streams has been carried on. Iodine contamination occurs in dissolver off-gases from uranium and plutonium production, reactor cooling air and exhaust air from hot laboratory facilities under conditions where there may be large variations in gas volume and temperatures which may range from ambient to 1500° C. for air cooled reactors. Heretofore no suitable apparatus or technique has been found for efficiently removing the radioactive iodine from these gas streams under the variety of conditions stated and at an efficiency greater than 90%, retaining 20–40 grams of iodine without significant reduction in efficiency and still have a collector life of 1–2 years in order to minimize the handling of the radioactive equipment. Furthermore, in view of the conditions of operation found in the production of uranium and plutonium in the operation of reactors and the type of exhaust air coming from hot laboratory facilities, it is most desirable for the iodine collection equipment to operate satisfactorily at temperatures up to 400° C. and in the presence of nitric acid mist and fumes, ammonia and other corrosive substances found in dissolver off-gases. It would also be helpful if such collector equipment had a low resistance to gas flow, had minimal space requirements, and be constructed of fireproof materials.

The present invention meets, to a greater extent than heretofore obtainable, all the requirements set forth above for the removal of iodine from process or ventilation gas streams. Briefly, the invention includes a matrix of fibers capable in the first instance of acting as a mechanical filter for particulate iodine or other radioactive solids or mist. The fibrous material is in one embodiment of this invention a copper ribbon filament woven in mesh form compressed to a pad and treated with silver to protect the copper surface from oxidation and react chemically with the iodine appearing in the gases passing therethrough. The copper fibrous pad provides a low cost, mechanical support with high voidage to permit good contact and bonding for the silver. The combination of the silver and the copper is also heat and acid resistant to a very marked degree and has been found to be very effective in the performance up to the desired temperatures of 400° C. In addition, the copper as the supporting medium will function as a secondary line of defense in the event of complete utilization or partial destruction of the silver.

It is a first object of this invention to provide a method and apparatus for collecting iodine from a gaseous medium.

It is a further object of this invention to provide for the collection of iodine at high temperatures and in the presence of other corrosive materials found in the gaseous iodine-containing material.

It is still another object to provide an iodine filter having efficiencies greater than 90% and a collector life of an extended period permitting retention of large amounts of iodine without significant reduction in efficiency.

Other objects and purposes of this invention will hereinafter become more apparent with reference made to the following description of specific embodiments of this invention.

The collector found to be most suitable for the purposes of this invention consists of a copper ribbon filament 2 x 25 mils woven in mesh form and compressed to a pad of approximately 27 pounds per cubic foot density. Such a product is commercially available and sold under the trade name of "Chore Girl," manufactured by the Metal Textile Company, Roselle, New Jersey. Because of oxidation difficulties associated with the use of copper and for other reasons hereinafter made apparent, a silver coating on the copper has been found to be suitable for the practice of this invention. In one preferred embodiment the copper is electroplated with silver which, as is understood in the art, reacts with the iodine in the gaseous material and acts to protect the copper from the oxidation. The copper structure also provides, as noted previously, a low-cost mechanical support with high voidage which permits good contact and bonding for the silver.

It has also been found as an alternative to the silver coating, the copper pad may be treated by or exposed to hydrogen sulphide so as to form on the copper surface a coating of cupric sulphide. As is understood in the art, cupric sulphide prevents oxidation of the copper surface but permits the copper to react with the iodine, thereby releasing the sulphur. There is an ionic exchange taking place substituting the radioactive iodine for the sulphur.

A further modification of this invention found to produce an ionic exchange whereby there is a substitution for radioactive iodine for the sulphur, is the treatment of the silver coating with hydrogen sulphide to produce a silver sulphide layer on the silver coating. This treatment of the silver coating formed by electroplating as described above, with hydrogen sulphide, produces a similar sulphide layer as that described wherein the copper mesh was treated directly with hydrogen sulphide forming a cupric sulphide. The silver sulphide layer thus formed behaves as an effluent iodine removal mechanism where the iodine displaces the sulphur then reacts with the silver. This causes a further protective coating for the copper mesh increasing its longevity and retention ability.

In carrying out the process of this invention, where the gaseous material is at an elevated temperature, it would be precooled down to 300° C., but not more than 400° C. because silver iodide will not sublime until temperatures over 400° C. are reached. Where the gaseous material is below 400° C. or at ambient conditions, it would be preheated to 400° C. to obtain a more favorable reaction.

It has been found that the process of iodine removal may be improved somewhat by the presence of water vapor in addition to elevated temperatures in the gaseous material. Table I illustrates the effect of steam and temperature on iodine collection efficiency of the new copper ribbon described previously.

TABLE I

*The effect of steam and temperature on iodine collection efficiency [a] of new copper ribbon*

| Test No. | Air Temp., °C. | Steam Rate, lbs., 1,000 cu. ft.[b] | Test Duration, min. | Collection Efficiency, percent |
|---|---|---|---|---|
| 1 | 25 | 0 | 20 | 97.4 |
| 2 | 25 | 1 | 40 | 99.8 |
| 3 | 300–350 | 1 | 10 | 99.98+ |

[a] Face velocity 60 f.p.m., packing density 27 lbs. per cu. ft., bed depth 2 in., bed mass 400 gm., 0.1 in. water resistance at 25° C.
[b] Volume measured at temperature indicated in second column.

It has been found in life tests that with 300° C. operation and the addition of steam at the rate of 1 lb. per 1000 cu. ft. of air, the copper collector maintains high efficiency for a 25-hour period. Beyond this point efficiency decreases to less than 90%, thereby making the process at this temperature with the addition of steam very suitable for emergency or standby purposes rather than for permanent use. Therefore, where the radioactivity of the iodine increases to a large extent for a short period of time, it may be desirable to use this process with the steam therein to obtain the higher efficiencies for the short period of time.

In the process utilizing copper ribbon treated with dry hydrogen sulphide instead of silver, results indicate that hydrogen sulphide does not detract from the iodine collection characteristics.

Test results indicate that at room temperature operation, the iodine collection efficiency for silver-coated copper pads appears to be about the same as that for copper pads uncoated. High temperature tests at 300° C. show that iodine efficiency and holding capacity is much greater but whereas the copper pads failed after about 30 hours of high temperature operation, the silver-plated copper units were still effective, 99.6% efficiency after 100 hours of continuous exposure.

The silver-plated copper ribbon displays a failing which presents an operational problem. Once exposed to high temperature, the collector becomes ineffective at room temperature, decreasing to 31.5% efficiency. However, upon reheating the gas stream to 300° C., the collector efficiency returns to values in excess of 99.6%. Efficiencies reported for copper and silver-plated copper ribbon apply only to high iodine concentrations at 50 mg. per cubic meter. Separate tests, wherein nitric acid fume or anhydrous ammonia (about 500 parts per million) were added to the inlet gas stream indicated no significant effect on iodine removal characteristics.

It should be noted that while silver plating can be placed on inorganic and some organic fibers for the removal of iodine, these structures do not provide the secondary line of defense in the event of complete utilization or partial destruction or baring of the silver to the base surface as it does when the base material is copper. In the concept of this invention, the copper then can still function to remove the iodine. Other metals such as bismuth and cadmium function similarly to the copper but to a lesser degree and are not temperature stable at elevated temperatures.

Thus it is seen that there has been developed a highly efficient collector of iodine having excellent collection characteristics and a life of sufficient length to make it practical, useful and economical. The collector is capable of extracting large amount of the iodine from the gas medium flowing therethrough and will operate in the presence of other highly corrosive materials. The process for carrying out the collection utilizing this particular collector developed operates most efficiently and satisfactorily at approximately 300° C. and not exceeding 400° C. since the higher the temperature approached in carrying out the process the more efficient will be the removal of the iodine, with the limitation that the temperature of operation must not be at a level which will cause the sublimaion of the iodides formed on the surface of the copper ribbon material collector.

Obviously other modifications and variations are possible in the light of the above teachings. It is therefore to be understood that within the scope of the appended claims, the invention may be practiced otherwise than as specifically described.

What is claimed is:

1. Iodine filtering apparatus comprising a pad composed of compacted fibrous copper material having a coating of silver deposited on the exposed copper surface, said silver coating being treated with hydrogen sulphide forming a layer of silver sulphide.

2. A method of removing iodine from a gaseous medium comprising the steps of adjusting the temperature of said medium to an elevated temperature not exceeding 400° C. and passing said medium through a porous copper fibrous pad having deposited thereon a coating of silver, said silver coating being treated with hydrogen sulphide forming a layer of silver sulphide.

3. A method of removing iodine from a gaseous medium comprising the steps of adjusting the temperature of said medium to an elevated temperature not exceeding 400° C., adding water vapor to said medium in approximate amounts of 1 lb. per cubic foot of said medium, and passing said medium through a porous copper fibrous pad having deposited thereon a coating of silver, said silver coating being treated with hydrogen sulphide forming a layer of silver sulphide.

References Cited in the file of this patent

UNITED STATES PATENTS 2,795,482    McNabney    June 11, 1959